(12) United States Patent
Horie et al.

(10) Patent No.: US 6,323,765 B1
(45) Date of Patent: Nov. 27, 2001

(54) TIRE AIR-PRESSURE ABNORMALITY ALARMING DEVICE AND METHOD THEREOF

(75) Inventors: Hiroto Horie, Akashi; Minao Yanase, Kobe; Mikao Nakajima, Itami; Yasushi Kobayashi, Toyota; Masaaki Komazawa, Aichi-ken, all of (JP)

(73) Assignees: Sumitomo Rubber Industries, Ltd., Kobe; Sumitomo Electric Industries, Ltd., Osaka, both of (JP)

(*) Notice: Subject to any disclaimer, the term of this patent is extended or adjusted under 35 U.S.C. 154(b) by 0 days.

(21) Appl. No.: 09/129,403

(22) Filed: Aug. 5, 1998

(30) Foreign Application Priority Data

Aug. 12, 1997 (JP) .................................................. 9-217736

(51) Int. Cl.[7] .................................................. B60C 23/00
(52) U.S. Cl. .................. 340/442; 340/444; 340/447; 73/146.2; 73/146.5; 702/98
(58) Field of Search .................. 340/442, 443, 340/444, 448, 447; 703/98, 96, 140; 73/146.2, 146.4, 146.5, 146.8, 715, 744; 702/105, 98

(56) References Cited

U.S. PATENT DOCUMENTS

| | | | |
|---|---|---|---|
| 5,497,657 | * 3/1996 | Taguchi et al. | 73/146.2 |
| 5,783,991 | * 7/1998 | Jones | 340/444 |
| 5,838,230 | * 11/1998 | Jones | 340/444 |
| 5,929,330 | * 7/1999 | Ford | 73/146.8 |
| 5,939,977 | * 8/1999 | Monson | 340/442 |
| 5,940,781 | * 8/1999 | Nakajima | 702/98 |
| 5,982,279 | * 11/1999 | Tominaga et al. | 340/444 |
| 6,034,597 | * 3/2000 | Normann et al. | 340/447 |

FOREIGN PATENT DOCUMENTS

A-5133831  5/1993  (JP).
A-7149119  6/1995  (JP).

* cited by examiner

*Primary Examiner*—Edward Lefkowitz
*Assistant Examiner*—Davetta W. Goins

(57) ABSTRACT

A tire air-pressure abnormality alarming device for informing decrease in air-pressure of tires attached to a four-wheeled vehicle, characterized in that the device prohibits start of initializing operations for updating stored values for physical amounts related to tires or wheels in the case where air-pressures of the tires are judged to be normal, if air-pressure abnormality of a tire is being alarmed. Initialization is accepted only after the internal pressure has become normal, whereby erroneous initialization with any tire being in a decompressed condition can be prevented. Thus, normal operations for detecting decompression of a tire can be maintained.

10 Claims, 6 Drawing Sheets

TIRE AIR-PRESSURE ABNORMALITY ALARMING DEVICE AND METHOD THEREOF

BACKGROUND OF THE INVENTION

1. Field of the Invention

The present invention relates to a tire air-pressure abnormality alarming device and a method thereof. More particularly, it relates to a tire air-pressure abnormality alarming device and a method thereof capable of maintaining normal operations for detecting decompression of a tire.

2. Description of Related Art

It might happen that air-pressure of a tire decreases due to unexpected factor such as a blowout or damage of a valve. When a vehicle continues running with a tire of decreased air-pressure, the tire is increasingly deformed and generates heat in the worst case, the tire may burst. Therefore, numerous devices for alarming abnormalities in tire air-pressure have been proposed in the past.

For instance, a method is known for detecting a decrease in internal pressure based on relative differences in the number of revolutions of tires (see Japanese Unexamined Patent Publication No. 149119/1995).

However, since variations in the diameter of tires having the same size are larger than the rate of change in the number of revolutions of the tires due to decompression of approximately 30%, it cannot be determined whether the internal pressure is normal or abnormal when a tire has been exchanged. Therefore, it is required to preliminarily store a relative difference or rate between the number of revolutions of tires when the internal pressures are normal at an initial stage if a tire has been exchanged.

A method has also been proposed for detecting a decrease in air-pressure based on changes in frequency characteristics of tire rotation (see Japanese Unexamined Japanese Patent Publication No. 133831/1993). In this method, when a tire or wheel has been exchanged, the frequency characteristics of tire rotation changes accompanied by a change in unspring weight, that is, the total weight of the tires and wheels, so that it is required to store resonant frequencies of a set of these tires and wheels at a normal internal pressure.

Several methods are known for starting operations for calculating and storing variations in tire diameters or resonant frequencies of tire rotations when the tires are at a normal internal pressure. For example, pressing a press button switch for more than a specified time, short-circuiting a specified terminal to IG or GND (grounding), stepping on the brake for a prescribed number of times within a specified time or continuously stepping thereon for a specified time, or combining some of these methods.

However, maintaining normal operations for detecting decompression of a tire becomes difficult in the following cases.

1. When initialization is started with a tire being in a decompressed condition:

A driver can recognize an abnormality of a tire when air pressure of a tire has decreased, a tire air-pressure abnormality alarming function is actuated and an alarm lamp is turned on. However, since an external appearance of a tire of which air-pressure has decreased by 30% from a prescribed initial pressure is hardly distinguishable from that of a tire of normal air-pressure since a limited number of vehicles are always equipped with air-pressure meters, the driver might erroneously consider that the internal pressure is correct and consider instead that the alarm lamp has turned on due to a failure of the alarming device.

In this case, an initializing switch might be pressed with the aim of turning the alarm lamp off in a hurry when a design in which initialization is started by pressing a press button switch is used. Consequently, initialization is started regardless of the fact that the air-pressure of a tire has decreased, and the alarm lamp is turned off.

Further, erroneous initialization is also started when the driver considers the air-pressure of a tire to be normal and short-circuits a specified terminal to a 12V line such as IG and BATT, or GND, or operates the brake in accordance with a special series of steps.

2. When initialization is to be started while the vehicle is running:

If initialization is started by pressing an initializing switch, pressing the initializing switch after start of driving means that the driver needs to perform an action that the driver usually does not take during driving. Therefore, displaying completion of acceptance such that the driver might recognize it when the driver has pressed the initializing switch during driving of the vehicle (e.g. blinking the lamp three times) will thus induce dangerous operations.

3. When initialization is to be started in an inspection mode:

At the time of inspection before shipping vehicles from factories, operation of the hardware such as an alarm lamp or switches are confirmed in an inspection mode which is different from normal operation.

However, when the essential initialization is started at the time of inspecting switches, it might happen that the set up of air-pressure is inappropriate or that an inappropriate coefficient is stored by rotating four wheels on a chassis dynamo.

4. When initialization is to be started when the device is broken or in a terminated condition:

A device which detects an abnormality in air-pressure of a tire based on the number of revolutions of tires of four wheels cannot correctly function when, for example, wheel speed pulses are not correctly input to the device. It is thus required to periodically check (e.g. at periods of 40 msec) the wheel speed input. There are known methods therefor such as observing input voltages through hardware or detecting broken lines of the wheel speed pulse input lines by comparing the number of revolutions of the tires of the four wheels through software.

If the driver has pressed the initializing switch for starting initialization just after breakdown of a wheel speed pulse has been detected through this self-diagnosis, the driver will erroneously consider that the device is functioning in a normal condition although it is not the case when the device displays completion of acceptance recognizable to the driver (e.g. the lamp blinking three times). Similarly, when a function of the device has been terminated due to malfunctions which frequently occur in the software or the like, displaying completion of acceptance upon pressing the initializing switch will make the driver erroneously consider that the device is functioning correctly though functions are in a terminated condition.

The present invention has been made in view of these facts, and it is an object thereof to provide a tire air-pressure abnormality alarming device and a method thereof which is capable of maintaining a correct function of detecting decompression of a tire by setting starting conditions for initializing operations for updating stored values for physical amounts related to tires or wheels.

SUMMARY OF THE INVENTION

In accordance with a first aspect of the present invention, there is provided a tire air-pressure abnormality alarming device for informing a driver of a decrease in air-pressure of tires attached to a four-wheeled vehicle, characterized in that the device prohibits the start of initializing operations for updating stored values for physical amounts related to tires or wheels when air-pressure of the tires is judged to be normal, if air-pressure abnormality of a tire is being alarmed.

In accordance with a second aspect of the present invention, there is provided a tire air-pressure abnormality alarming device for informing a driver of a decrease in air-pressure of tires attached to a four-wheeled vehicle, characterized in that the device prohibits the start of initializing operations for updating stored values for physical amounts related to tires or wheels when air-pressure of the tires is judged to be normal, if the vehicle is judged to be in a running condition.

In accordance with a third aspect of the present invention, there is provided a tire air-pressure abnormality alarming device for informing a driver of a decrease in air-pressure of tires attached to a four-wheeled vehicle, characterized in that the device prohibits the start of initializing operations for updating stored values for physical amounts related to tires or wheels when air-pressure of the tires is judged to be normal, if an inspection mode is being assumed.

In accordance with a fourth aspect of the present invention, there is provided a tire air-pressure abnormality alarming device for informing a driver of a decrease in air-pressure of tires attached to a four-wheeled vehicle, characterized in that the device prohibits the start of initializing operations for updating stored values for physical amounts related to tires or wheels when air-pressure of the tires is judged to be normal, if a system is in an abnormal condition or in a terminated condition.

In accordance with a fifth aspect of the present invention, there is provided a tire air-pressure abnormality alarming method comprising detecting rotational angular speeds of tires or wheels of a four-wheeled vehicle, storing coefficients related to the tires or wheels obtained from the rotational angular speeds, and determining whether air-pressure has decreased or not from a relationship between a threshold and a determined value for decompression obtained from rotational angular speeds which have been corrected by using the coefficients, characterized in that the method prohibits the start of initializing operations for updating stored values for physical amounts related to tires or wheels when air-pressure of tires is judged to be normal, if air-pressure abnormality of a tire is being alarmed.

In accordance with a sixth aspect of the present invention, there is provided a tire air-pressure abnormality alarming method comprising detecting rotational angular speeds of tires or wheels of a four-wheeled vehicle, storing coefficients related to the tires or wheels obtained from the rotational angular speeds, and determining whether air-pressure has decreased or not from a relationship between a threshold and a determined value for decompression obtained from rotational angular speeds which have been corrected by using the coefficients, characterized in that the method prohibits the start of initializing operations for updating stored values for physical amounts related to tires or wheels when air-pressure of tires is judged to be normal, if the vehicle is judged to be in a running condition.

In accordance with a seventh aspect of the present invention, there is provided a tire air-pressure abnormality alarming method comprising detecting rotational angular speeds of tires or wheels of a four-wheeled vehicle, storing coefficients related to the tires or wheels obtained from the rotational angular speeds, and determining whether air-pressure has decreased or not from a relationship between a threshold and a determined value for decompression obtained from rotational angular speeds which have been corrected by using the coefficients, characterized in that the method prohibits the start of initializing operations for updating stored values for physical amounts related to tires or wheels when air-pressure of tires is judged to be normal, if an inspection mode is being assumed.

In accordance with an eighth aspect of the present invention, there is provided a tire air-pressure abnormality alarming method comprising detecting rotational angular speeds of tires or wheels of a four-wheeled vehicle, storing coefficients related to the tires or wheels obtained from the rotational angular speeds, and determining whether air-pressure has decreased or not from a relationship between a threshold and a determined value for decompression obtained from rotational angular speeds which have been corrected by using the coefficients, characterized in that the method prohibits the start of initializing operations for updating stored values for physical amounts related to tires or wheels when air-pressure of tires is judged to be normal, if a system is in an abnormal condition or in a terminated condition.

It should be noted that, in the present invention, tire air pressure is judged to be normal when conditions are met in which the driver has continuously pressed the press button switch for more than a specified time, in which a specified terminal has been short-circuited to IG or GND, in which the brake has been stepped on for a determined number of times within a specified time, or in which the brake has been continuously stepped on for a specified time.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF EXPLANATION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENTS

The tire air-pressure abnormality alarming device and method thereof of the present invention will now be explained based on the accompanying drawings.

Figure 1:
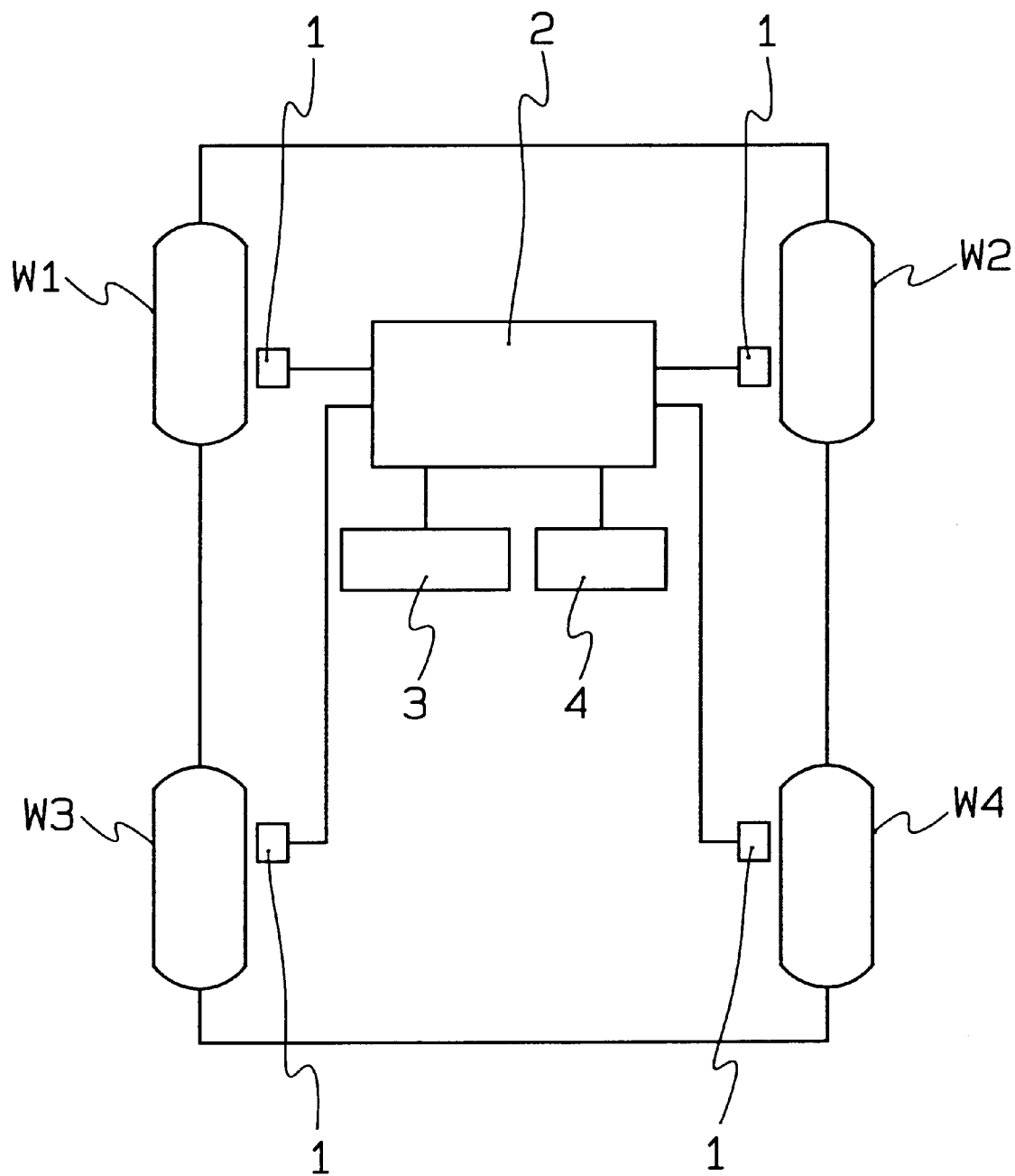
FIG. 1 is an explanatory view showing an embodiment of a tire air-pressure abnormality alarming device of the present invention.

As shown in FIG. 1, a tire air-pressure abnormality alarming device (DWS) comprises wheel speed sensors 1 of normal arrangement which are respectively arranged in connection with each of tires W1, W2, W3, W4 of a four-wheeled vehicle. Outputs of the wheel speed sensors 1 are supplied to a DWS control unit 2. An initializing switch 3 in the form of a press button for starting initialization and a display means 4 for displaying air-pressure abnormalities are connected to the control unit 2.

Figure 2:
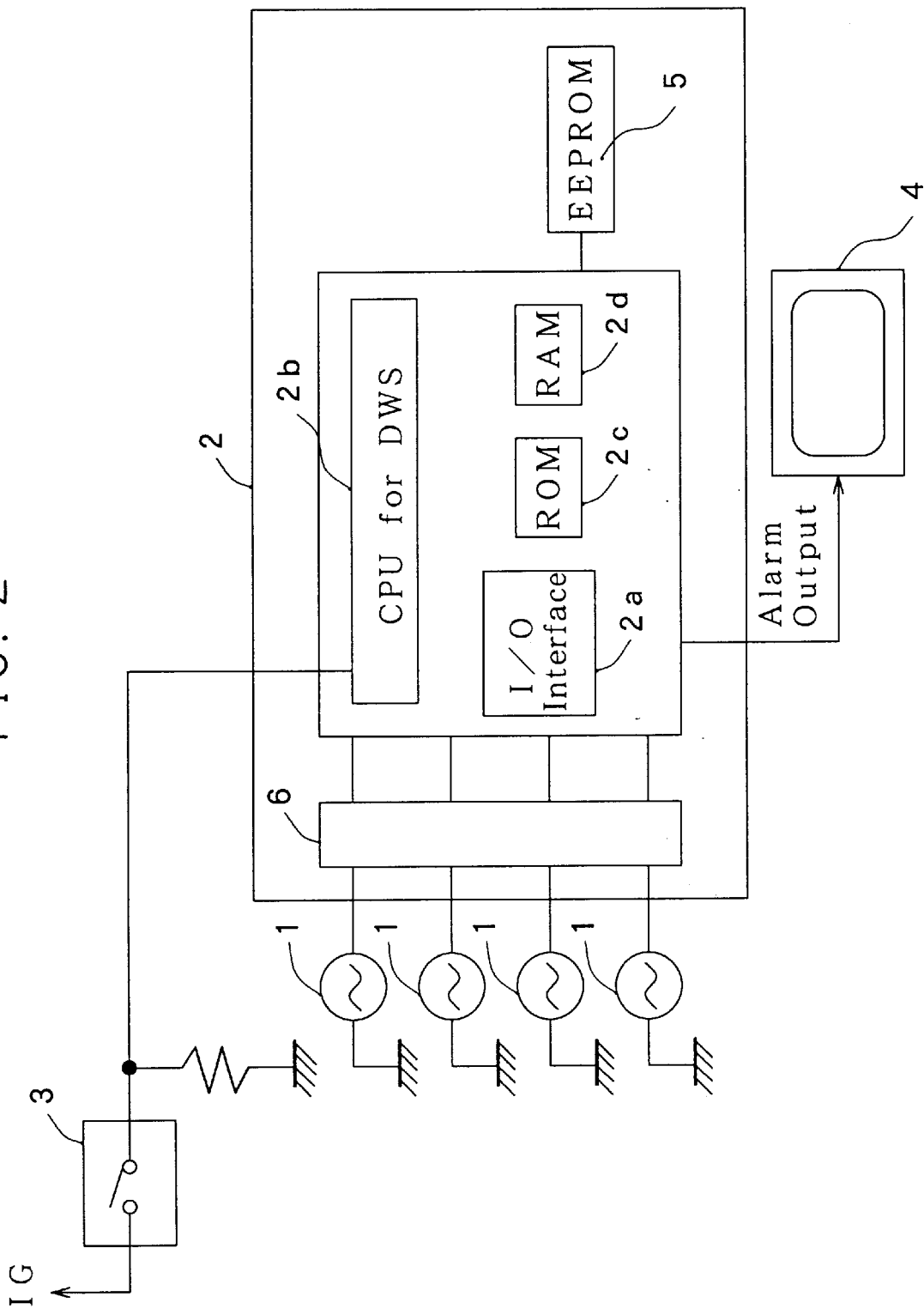
FIG. 2 is a block diagram showing electric arrangements of the tire air-pressure abnormality alarming device of FIG. 1.
Figure 3:
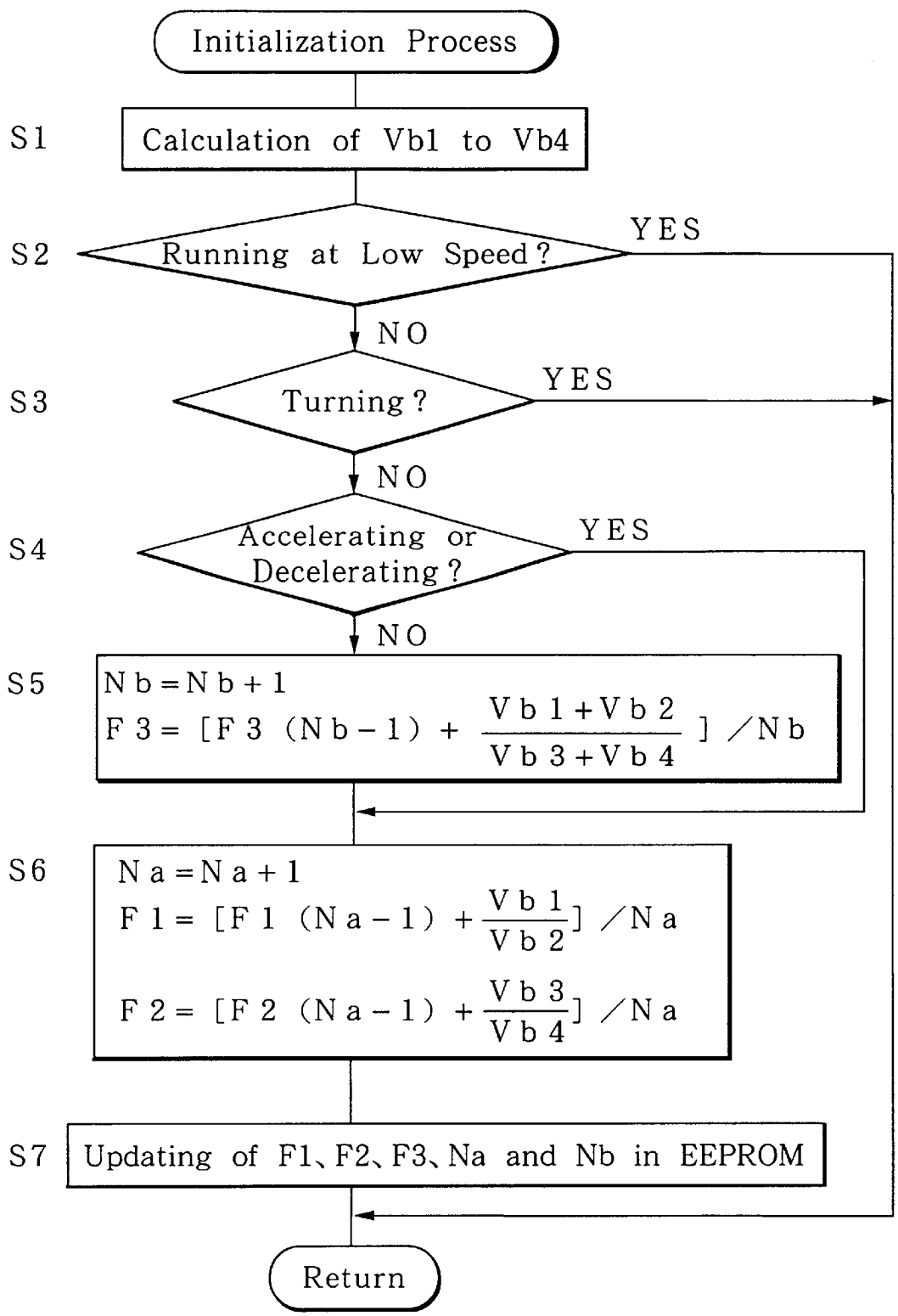
FIG. 3 is a flowchart showing initial correction processes in the present invention.

As shown in FIG. 2, the control unit 2 is, for instance, composed of a microcomputer, and its hardware arrangement includes an I/O interface 2a required for sending/receiving signals to/from an external device, a CPU 2b for the DWS which functions as a center of calculation, a ROM 2c which stores a control operation program for the CPU 2b, a RAM 2d into which data are temporally written and are read out therefrom when the CPU 2b performs control operations, and an EEPROM 5 which is a non-volatile memory for storing initializing coefficients F1 to F3 which will be discussed later.

Initial correction processes of the present invention will now be explained.

The wheel speed sensor 1 outputs a signal corresponding to the number of revolutions of tire Wi (wherein "i" corresponds to each of the affixed numbers "1,2,3,4" of each of the tires W1, W2, W3, W4). More particularly, the wheel speed sensor 1 outputs a sinusoidal signal corresponding to changes in a magnetic field generated by the rotation of a multi-geared sensor rotor which is provided at an inner side of the wheel of tire Wi. This sinusoidal signal is converted into a pulse signal (hereinafter referred to as "wheel speed pulse") in a binarization circuit 6, and the CPU 2b calculates a rotation angular speed Vbi of tire Wi (or wheel) based on the converted wheel speed pulse. Particularly, the calculation of rotation angular speed Vbi (Vb1 to Vb4) is performed by the following equation (Step S1) wherein Ni denotes a number of pulses as counted from the last pulse of the preceding measuring period up to the last pulse of the prevailing measuring period, Ti time, and K a coefficient corresponding to a rotation angle of the wheel per pulse:

$$Vbi = K \times Ni / Ti$$

The CPU 2b judges whether the vehicle is running at a low speed or not (Step S2). If it is not running at a low speed, the program proceeds to the next step. The reason why the program does not proceed to the following steps when the vehicle is running at a low speed is that quantization errors become large since the number of input pulses decreases when the vehicle is running at a low speed.

Next, it is judged whether the vehicle is making a turn or not (Step S3). This judgement is performed by obtaining, for instance, a turning radius from rotational angular speeds of right and left tires.

If the vehicle is not making a turn, it is judged whether the vehicle is accelerating or decelerating (Step S4). If the vehicle is not accelerating or decelerating, right and left front wheels ratio F1, right and left rear wheels ratio F2 and front and rear wheels ratio F3 which are initializing coefficients for correcting variations in tire radiuses or wheel radiuses based on the rotational angular speed Vbi.

$$F1 = Vb1/Vb2$$
$$F2 = Vb3/Vb4$$
$$F3 = (Vb1+Vb2)/(Vb3+Vb4)$$

It should be noted that when the vehicle is accelerating/decelerating, only the right and left front wheels ratio F1 and the right and left rear wheels ratio F2 are calculated, and the front and rear wheels ratio F3 is not calculated. The reason for setting such a condition only for the front and rear wheels ratio F3 is that when the vehicle is running in a neutral condition, (running without acceleration/deceleration) slip of the front or rear wheels might occur during driving.

Since high accuracy is required for initializing processes, it is preferable that the rotational angular speed ratios be updated in a gentle manner by taking averages of past rotational angular speed ratios at certain updating intervals instead of employing momentary rotational angular speed ratios F1, F2, F3. Supposing that the number of times for updating F1, F2 is set as Na, and the number of times for updating F3 is Nb, F1, F2 and F3 used for the updating are actually obtained by the following equation (1) (Step S5, S6). It should be noted that the reason for setting two different number of times for updating Na and Nb is that only F3 is required to meet the condition that the vehicle is running in a neutral condition (running without acceleration/deceleration) as explained above.

$$\left. \begin{aligned} F1 &= [\text{previous } F1 \times (Na-1) + \text{present } F1]/Na \\ F2 &= [\text{previous } F2 \times (Na-1) + \text{present } F2]/Na \\ F3 &= [\text{previous } F3 \times (Nb-1) + \text{present } F3]/Nb \end{aligned} \right\} \quad (1)$$

F1, F2, F3, Na, and Nb are stored in the EEPROM (non-volatile memory) each time updating is performed (Step S7), so that even when electric power has been cut during calculation, calculation can be continued by reading out F1, F2, F3, Na and Nb from the EEPROM at the next time when electric power has been turned on.

Figure 4:
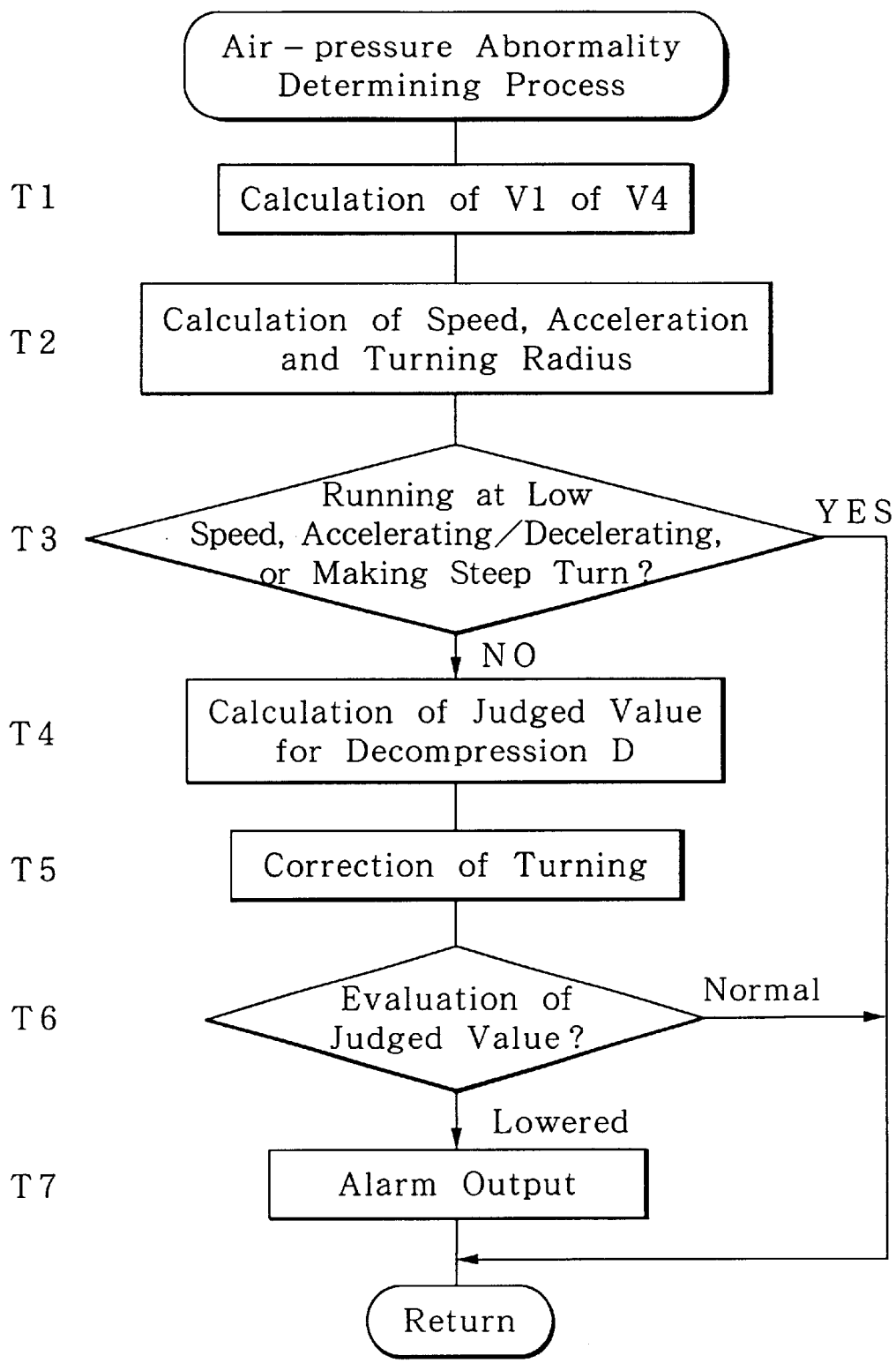
FIG. 4 is a flowchart showing air-pressure abnormality determining processes in the present invention.

Next, as shown in FIG. 4, for executing the air-pressure abnormality determining processes of the present invention, the rotational angular speed Vi after initial correction is obtained from the following equation (2) by using coefficients F1 to F3.

$$\left. \begin{aligned} V1 &= Vb1 \\ V2 &= Vb2 \times F1 \\ V3 &= Vb3 \times F3 \\ V4 &= Vb4 \times F2 \times F3 \end{aligned} \right\} \quad (2)$$

Next, the speed, acceleration (front and rear acceleration), and turning radius are calculated (Step T2). The acceleration can alternatively be obtained by equipping the vehicle with an acceleration meter. It can also be obtained from the rotational angular speed Vi (see Japanese Unexamined Patent Publication No. 92114/1994).

It is judged whether the vehicle is running at a low speed, is accelerating/decelerating, or is making a steep turn (Step T3). If neither applies, a judged value for decompression D is obtained from the following equation (3) (Step T4, see Japanese Unexamined Patent Publication No. 305011/1988).

$$D = \frac{(V1+V4)/2 - (V2+V3)/2}{(V1+V2+V3+V4)/4} \times 100 \quad (3)$$

Further, when the vehicle is making a gentle turn, the judged value D is corrected according to equation (4) in order to eliminate influences of variable factors on the judged value D such as turning radius R of the vehicle, speed, lateral directional acceleration (lateral G), and front and rear directional acceleration (front and rear G) (Step T5, see Japanese Unexamined Patent Publication No. 164720/1996).

$$D' = D - \frac{lateralG \times (A1 + A2 \times speed^2 + A3 \times front\ and\ rear\ G)}{|R|} \quad (4)$$

It should be noted that coefficients A1, A2, and A3 are preliminarily obtained based on turning radius R, speed, lateral G and front and rear G of the vehicle which have been obtained by performing a test running in which each of the tires Wi is of normal internal pressure.

By evaluating a relationship between judged value D or D' and the threshold (Step T6), it is judged whether the air-pressure has decreased or not. For instance, when threshold $D_{TH1}$ and $D_{TH2}$ are set at 0.1, it is determined that the air-pressure has decreased when the relationship between the judged value D' and the threshold satisfies $D'<-D_{TH1}$ or $D'>D_{TH2}$, an alarm is output by making a specified display on the display device 4 of FIG. 2 (Step T7). It should be noted that while the air-pressure abnormality determining process is performed for each measuring period, it is also possible to output an alarm only when judgements that the threshold has been exceeded are successively obtained for a certain number of times in order to stabilize contents of determination (see Japanese Unexamined Patent Publication No. 186644/1995). With this arrangement, erroneous generation of an alarm due to unexpected influences such as noise can be prevented.

Figure 5:
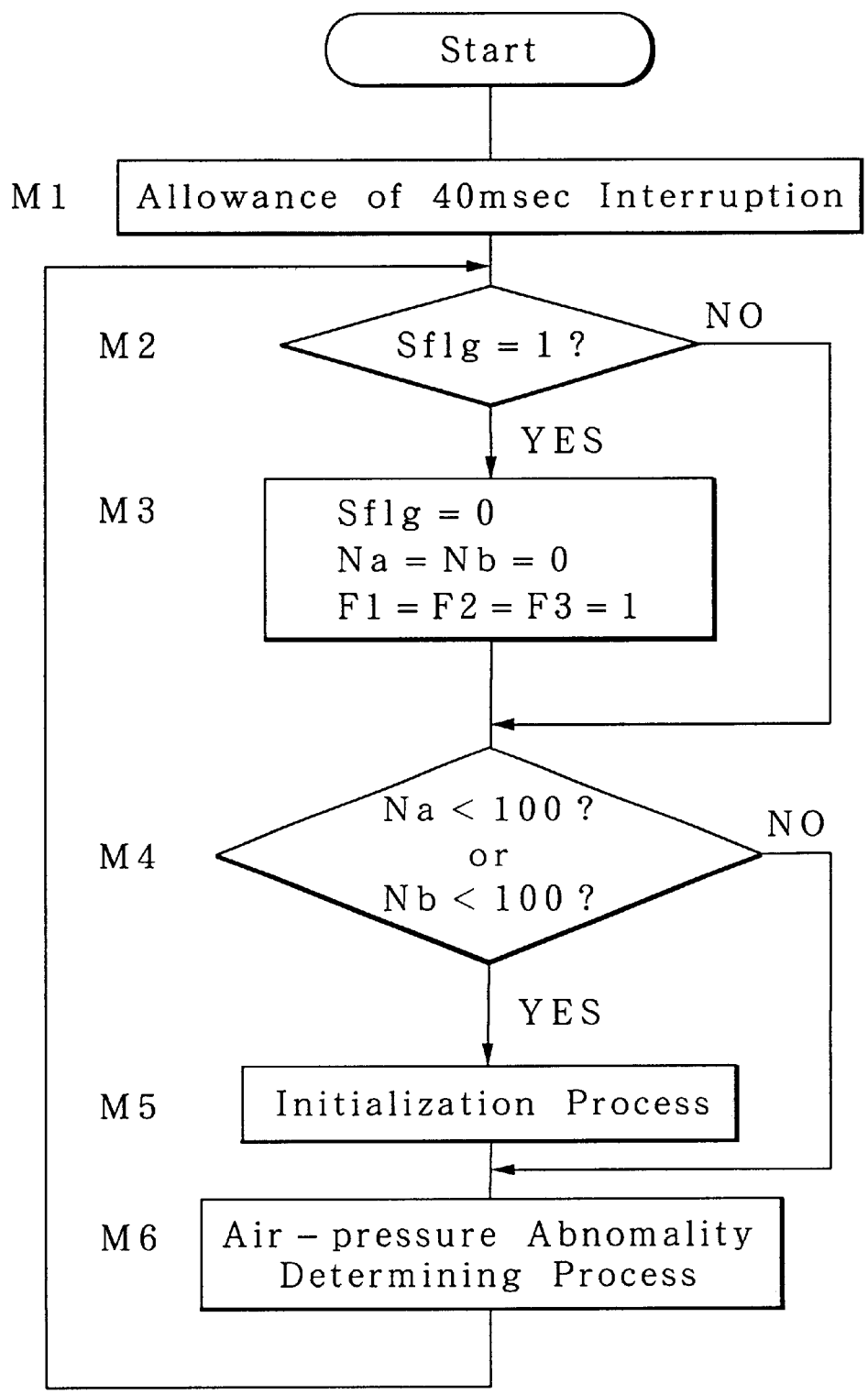
FIG. 5 is a flowchart of a program showing processes at the time of starting initialization and operations during initializing processes.

Processes performed at the start of initialization and operations during the initializing processes will now be explained by using a main flowchart (FIG. 5) indicating the whole program.

Figure 6:
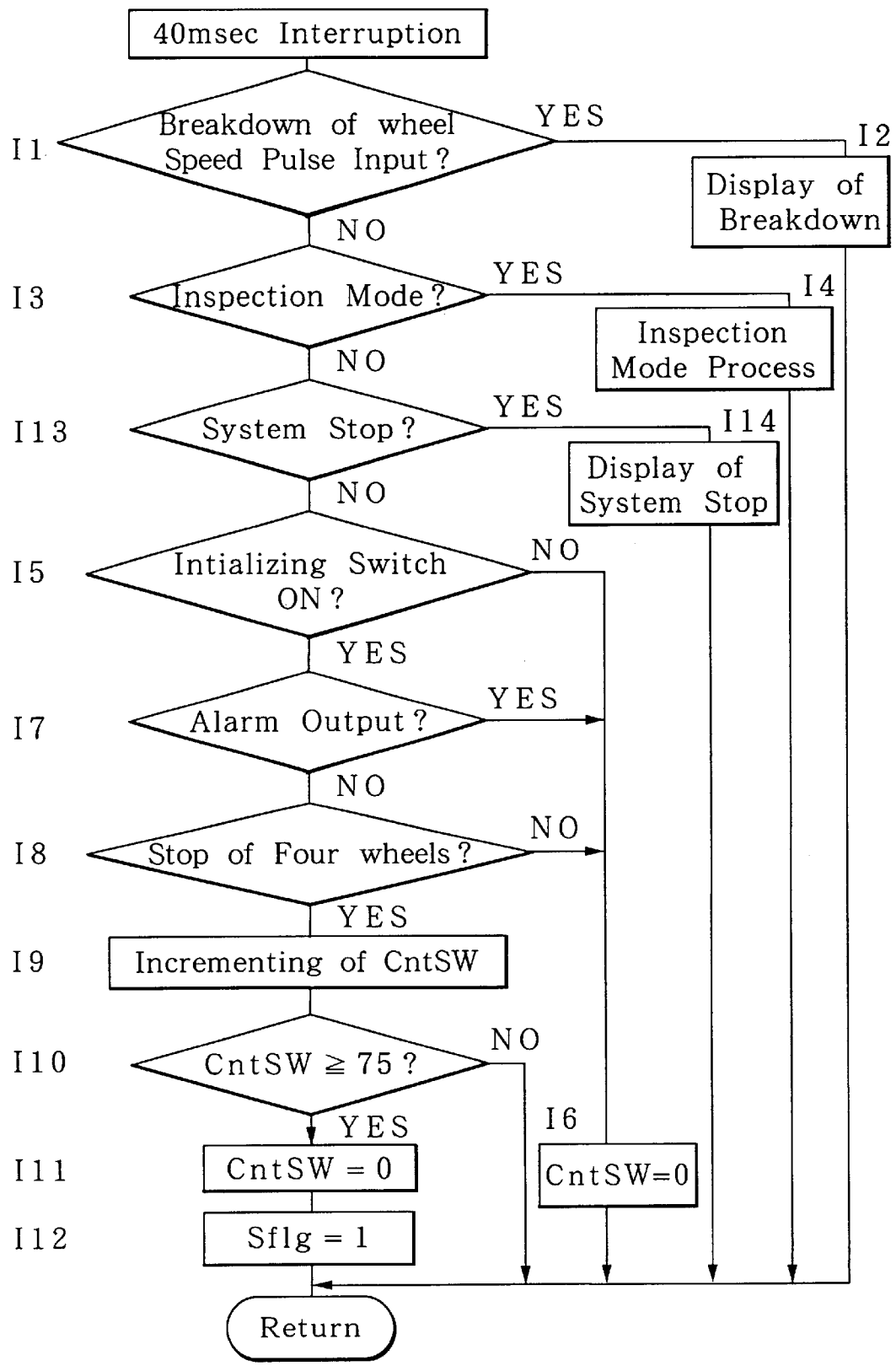
FIG. 6 is a flowchart of interrupting processes at 40 msec.

When the program is started, timer interrupting processes are first allowed (Step M1). When timer interrupting processes are allowed, a timer interrupting program is operated thereafter at specified periods, e.g. 40 msec (FIG. 6). In the main program, periodical processes are performed thereafter for, e.g. each second.

It is judged whether an initialization start command has been released (Sflg=1?) (Step M2), and if such a command has been released, counters for initialization NA, Nb are cleared to be 0, and coefficients F1 to F3 are cleared to be 1 (Step M3).

It is then judged whether the initializing process shall be performed now. If either of the counters Na, Nb does not satisfy a specified value, e.g. 100 (Step M4), F1 to F3 are updated and initializing processes for storing these in the EEPROM are continued (Step M5).

Thereafter, air-pressure abnormality determining processes are performed (Step M6), and the program awaits the following process period.

Since determination of initializing switch input, operation of alarm lamp or self-diagnosis for detecting a breakdown need to be performed at exact periods, these are performed in the timer interrupting processes.

Thus, since determination of start of initialization is also performed in the timer interrupting process, the determining operations for start of initialization will be explained by employing a flowchart of 40 msec interrupting process.

First, as shown in FIG. 6, diagnosis whether the wheel speed pulse input is defect is performed (Step I1). If any of the pulse numbers NINTi (i=1,2,3,4) of the four wheels during 40 msec which are taken in at 40 msec periods indicate that the vehicle is running (e.g. not less than 4 pulses), and any of the pulse numbers NINTi of the four wheels indicate that the vehicle is in a terminated condition (0 pulse), it is determined that the terminated wheel speed pulse input is defect and breakdown is displayed by e.g. turning on a lamp (Step I2).

It is then judged whether the prevailing mode is an inspection mode or not (Step I3). More particularly, if the potential of the input port of the CPU changes by short-circuiting a specified pin of a connector of the device to IG or GND, it is determined that the prevailing mode is an inspection mode. If the prevailing mode is the inspection mode, inspection mode processes for confirming hardware operations such as an initializing switch or an alarm lamp are performed (Step I4).

Next, by referring to a system-terminated flag, it is judged whether the system is in a terminated condition or not (Step I13). If the system-terminated flag is ON, the driver is informed that the system is in a terminated condition by making a display e.g. through blinking the lamp (Step I14).

The system-terminated flag is set by reading in a flag which has been stored in the EEPROM into the RAM at the time when power is turned on. The system-terminated flag in the EEPROM can be set by communicating with an external device, by combining operation of the initializing switch or brake etc., or by short-circuiting a specified terminal to IG or GND in order to make the microcomputer recognize that the system is in a terminated condition. It is also possible to set the system-terminated flag by making the microcomputer recognize that the system is in a terminated condition through changing the condition of the port of the microcomputer by means of a dip-switch or the like.

By judging the potential of the port input of the CPU connected to the initializing switch, it is judged whether the initializing switch has been pressed or not (Step I5). If it has not been pressed, the counter for the determining switching is cleared (Step I6).

If it has been pressed, it is judged whether an alarm is being output or not by referring to a specified flag as determined in the air-pressure abnormality determining processes (a flag indicating whether the air-pressure is abnormal or normal)(Step I7), and if an alarm is being output, the counter for the determining switching is cleared (Step I6).

If any of the pulse numbers NINTi of the four wheels is not 0, it is determined that the vehicle is running (Step I8), and the counter for the determining switching is cleared (Step I6).

In this manner, if the system is not defect, the prevailing mode is not the inspection mode, the system is not in a terminated condition, the initializing switch has been pressed, no alarm is being output, and the tire rotational angular speeds of all four wheels are 0 (the vehicle is not running), the counter is incremented (Step I9), and if it is determined that a specified time (e.g. 3 seconds) has elapsed, the counter is cleared and the initialization-started flag (Sflg) is set (Steps 10, 11, 12).

According to the first and fifth aspects of the present invention, start of initialization is not accepted when an alarm is being output when initialization is to be started with any tire being in a decompressed condition so that erroneous operations of the driver is prevented. With this arrangement, initialization is accepted only after the internal pressure has become normal, whereby erroneous initialization with any tire being in a decompressed condition can be prevented. Thus, normal operations for detecting decompression of a tire can be maintained.

According to the second and sixth aspects of the present invention, start of initialization is not accepted when the vehicle is running when initialization is to be started while the vehicle is running, and this arrangement is to be described in an operations manual. With this arrangement, any dangers during driving which might occur by operating a switch which is usually not actuated during driving can be eliminated.

According to the third and seventh aspects of the present invention, start of initialization is not accepted when the prevailing mode is an inspection mode when initialization is to be started under an inspection mode whereby it can be prevented for starting unnecessary initialization, and normal operations for detecting decompression of a tire can be maintained.

According to the fourth and eighth aspects of the present invention, an alarm lamp indicating an abnormality of the systems is turned on simultaneously with prohibiting acceptance of initialization when an abnormality has been detected in a self-diagnosis at the time when power is turned on or a self-diagnosis which is regularly repeated thereafter, in case the driver is trying to start initialization when the device is defect or in a terminated condition. With this arrangement, erroneously recognizing that the device is operating normally by accepting only initialization and a breakdown of the device can be rapidly detected and prevented. Further, normal operations for detecting decompression of a tire can be maintained.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A tire air-pressure abnormality alarming device for informing a driver of a decrease in air-pressure of tires attached to a four-wheeled vehicle, comprising:
    means for prohibiting start of initializing operations for updating stored air-pressure reference values for tires having a normal air-pressure, if air-pressure abnormality of a tire is being alarmed.

2. A tire air-pressure abnormality alarming device for informing a driver of a decrease in air-pressure of tires attached to a four-wheeled vehicle, comprising:
    means for prohibiting start of initializing operations for updating stored air-pressure reference values for tires having a normal air-pressure, if the vehicle is determined to be in a running condition.

3. A tire air-pressure abnormality alarming device for informing a driver of a decrease in air-pressure of tires attached to a four-wheeled vehicle, comprising:
    means for prohibiting start of initializing operations for updating stored air-pressure reference values for tires having a normal air-pressure, if an inspection mode is being assumed.

4. A tire air-pressure abnormality alarming device for informing a driver of a decrease in air-pressure of tires attached to a four-wheeled vehicle, comprising:
    means for prohibiting start of initializing operations for updating stored air-pressure reference values for tires having a normal air-pressure, if a system is in an abnormal condition or in a terminated condition.

5. A tire air-pressure abnormality alarming method comprising:
    detecting rotational angular speeds of tires or wheels of a four-wheeled vehicle;
    storing coefficients related to the tires or wheels obtained from the rotational angular speeds;
    determining whether air-pressure has decreased or not from a relationship between a reference value and a determined value for decompression obtained from rotational angular speeds corrected by using the coefficients; and
    prohibiting start of initializing operations for updating the stored reference values for tires having a normal air-pressure, if air-pressure abnormality of a tire is being alarmed.

6. A tire air-pressure abnormality alarming method comprising:
    detecting rotational angular speeds of tires or wheels of a four-wheeled vehicle;
    storing coefficients related to the tires or wheels obtained from the rotational angular speeds;
    determining whether air-pressure has decreased or not from a relationship between a reference value and a determined value for decompression obtained from rotational angular speeds corrected by using the coefficients; and
    prohibiting start of initializing operations for updating the stored reference values for tires having a normal air-pressure, if the vehicle is determined to be in a running condition.

7. A tire air-pressure abnormality alarming method comprising:
    detecting rotational angular speeds of tires or wheels of a four-wheeled vehicle;
    storing coefficients related to the tires or wheels obtained from the rotational angular speeds;
    determining whether air-pressure has decreased or not from a relationship between a reference value and a determined value for decompression obtained from rotational angular speeds corrected by using the coefficients; and
    prohibiting start of initializing operations for updating the stored reference values for tires having a normal air-pressure, if an inspection mode is being assumed.

8. A tire air-pressure abnormality alarming method comprising:
    detecting rotational angular speeds of tires or wheels of a four-wheeled vehicle;
    storing coefficients related to the tires or wheels obtained from the rotational angular speeds;
    determining whether air-pressure has decreased or not from a relationship between a reference value and a determined value for decompression obtained from rotational angular speeds corrected by using the coefficients; and
    prohibiting start of initializing operations for updating the stored reference values for tires having a normal air-pressure, if a system is in an abnormal condition or in a terminated condition.

9. A tire air-pressure abnormality alarming device for informing a driver of a decrease in air-pressure of tires attached to a four-wheeled vehicle, comprising:
    means for prohibiting start of initializing operations for updating stored air-pressure reference values for tires having a normal air pressure if one of the following is occurring:
        (a) if air-pressure abnormality of a tire is being alarmed;
        (b) if the vehicle is determined to be in a running condition;
        (c) if an inspection mode is being assumed; and
        (d) if a system is in an abnormal condition or in a terminated condition.

10. A tire air-pressure abnormality alarming method comprising:

detecting rotational angular speeds of tires or wheels of a four-wheeled vehicle;

storing coefficients related to the tires or wheels obtained from the rotational angular speeds;

determining whether air-pressure has decreased or not from a relationship between a reference value and a determined value for decompression obtained from rotational angular speeds corrected by using the coefficients; and prohibiting start of initializing operations for updating the stored reference values for tires having a normal air-pressure, if one of the following is occurring:
   (a) if air-pressure abnormality of a tire is being alarmed;
   (b) if the vehicle is determined to be in a running condition;
   (c) if an inspection mode is being assumed; and
   (d) if a system is in an abnormal condition or in a terminated condition.

* * * * *